2,943,036

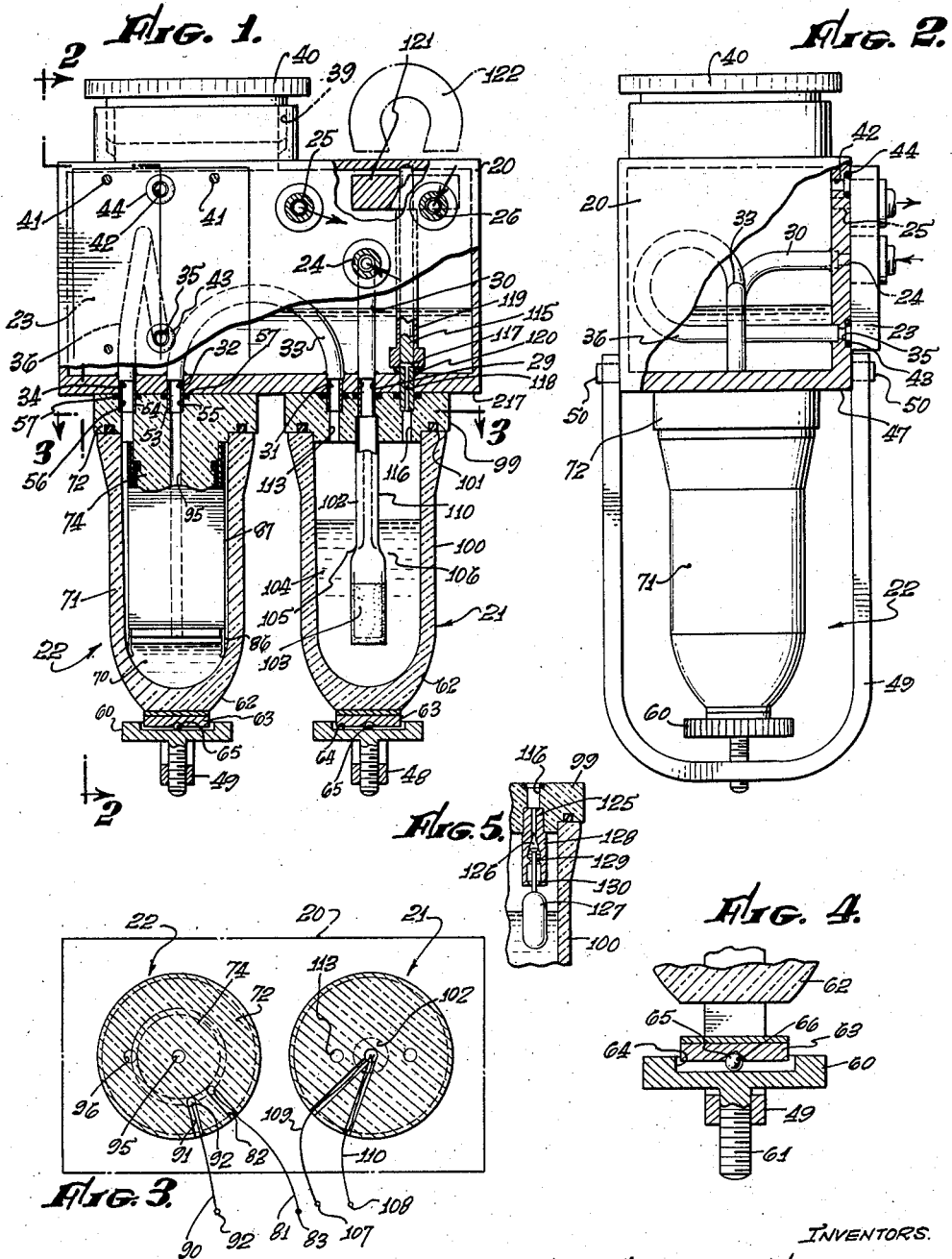

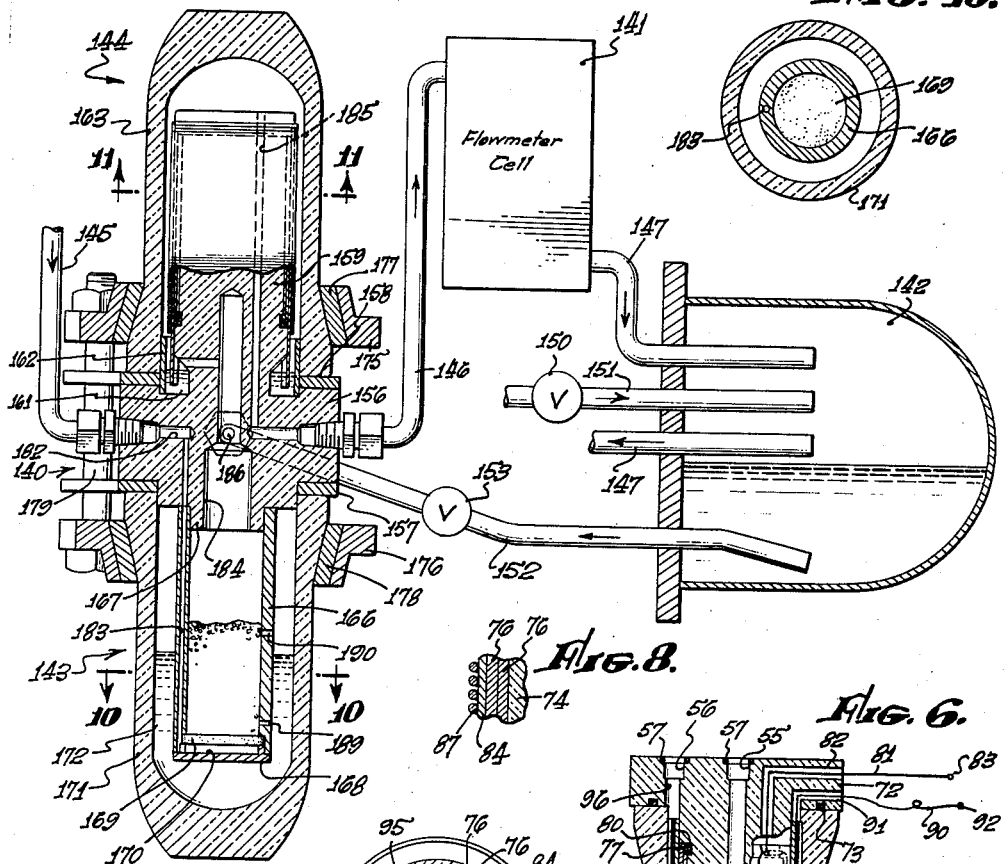
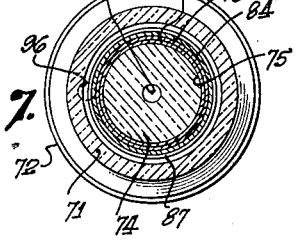
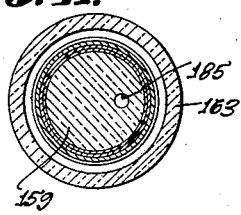

OXYGEN ANALYZER

Louis C. Thayer, Duarte, and Jan Haagen-Smit, South Pasadena, Calif., assignors, by mesne assignments, to Beckman Instruments, Inc., Fullerton, Calif., a corporation of California Filed May 13, 1957, Ser. No. 658,547

6 Claims. (Cl. 204—195)

This invention relates to gas analysis equipment and, in particular, to equipment comprising a plurality of interconnected cells through which the gas successively passes during the anlysis procedure. The unique apparatus described and claimed herein is suitable for use in connection with a number of gas analysis processes and is especially adapted for use with processes for determining the presence of small quantities of oxygen in other gases. The apparatus of the invention will be described as utilized in an oxygen trace analyzer; however, it is understood that the various unique structural features disclosed herein may be used in other gas analysis equipment.

The oxygen analysis process utilizes the well known principle of the galvanic cell comprising two electrodes coupled by an electrolyte with at least one of the electrodes, the cathode, positioned so that it may also be contacted by the gas being analyzed. In the absence of oxgyen, no reaction occurs in the cell, the cathode not being reactable with the electrolyte at any time and the anode being reactable with the electrolyte only when the electrolyte is reacting with oxygen at the cathode. However, in the presence of oxygen, an electro-chemical reaction occurs at the cathode and the oxygen is reduced in this process, the anode is partially dissolved and an electrical current is produced in an external circuit connecting the cathode and anode, the magnitude of the current being a function of the quantity of oxygen present in the incoming gas.

This process will be described herein in conjunction with a particular analysis cell; however, it is realized that the process is equally applicable to cells utilizing other materials and different combinations of materials. In the galvanic cell, an anode, which in this embodiment is of lead, is coupled to a cathode, which is of silver, by an electrolyte, which is an aqueous solution of potassium hydroxide. The electrodes may be coupled by being immersed in the electrolyte or by being separted by a layer of material which is soaked with the electrolyte. A portion of the cathode is exposed to the sample gas and when it contains oxygen, there is an electrochemical reaction at the interface of the cathode and the electrolyte involving the oxygen and also a eraction between the anode and the electrolyte which results in an electrical current in an external circuit coupling the anode and cathode. The reactions occur spontaneously upon closing the circuit externally, the net result being the consumption of oxygen and the dissolution of the lead electrode. The current generated is proportional to the partial pressure of oxygen in the gas surrounding the cathode. In the complete absence of oxygen, no reactions take place within the cell and there is no current produced. Any conventional current indicating or recording device may be connected to the electrodes to indicate the current generated.

It is preferred that this oxygen analysis process be carried out at a substantially constant temperature and at an approximately constant rate of flow and pressure, which may be at atmospheric pressure. If such constant conditions are not maintained, it is necessary to compensate the readings obtained for the variations, since the current output of the cell is a function of the temperature, rate of flow and pressure as well as of the oxygen content.

It has been found that in the operation of such an analysis cell, the linearity and long term stability of the oxygen content measurements may be substantially improved by utilizing an electrolyte of a particular concentration. The output of a cell with constant oxygen input varies with the concentration of the electrolyte, there being a value of concentration at which the output of the cell is substantially constant with small changes in concentration. It has been found that this concentration of the electrolyte is also the concentration of the electrolyte having the minimum specific resistance. For an alkaline electrolyte, such as potassium hydroxide, this point also corresponds to the concentration providing the maximum concentration of ions. For an aqueous solution of potassium hydroxide, the optimum point calls for 27.5 percent potassium hydroxide by weight, corresponding to approximately a 6.2 normal solution. In general, a cell will desirably be operated with the concentration of the electrolyte varying not more than ten percent from the concentration thereof at a minimum specific resistance, i.e., between 24.8 and 30.2 percent potassium hydroxide for an aqueous solution thereof.

It has also been found that the linearity and long term stability of the oxygen analysis process may be substantially improved by the operation of the analysis cell with a constant concentration for the electrolyte, preferably, of course, the optimum concentration described above. This is achieved by controlling the vapor pressure of the electrolyte solvent in the sample gas entering the analysis cell so that there is no transfer of solvent between the electrolyte in the analysis cell and the sample gas, thereby maintaining concentration of the electrolyte constant. In the specific example discussed above, the incoming sample gas is first passed through a container having water therein and is then passed through the analysis cell. The relative sizes of the first container and the analysis cell, the amount of water in the first container and the rate of flow of the gas through the container and cell are adjusted so that the vapor pressure of water in the sample gas leaving the first container will correspond to the equilibrium water vapor pressure over the electrolyte in the analysis cell. Under these conditions, water will neither be added to nor subtracted from the electrolyte in the cell by the sample gas passing therethrough.

In carrying out the sample gas humidifying process described above, it is preferred to use a somewhat diluted solution of the electrolyte in the first container and to bubble the sample gas therethrough. This provides a simple control for the amount of water vapor taken up by the sample gas by merely adjusting the concentration of this dilute solution of the electrolyte relative to the stronger solution of the electrolyte contained in the analysis cell.

The passing of the sample gas through a solution of the electrolyte in the first container also removes undesirable gases from the sample gas. These gases, such as carbon dioxide, hydrogen sulfide, acetylene, hydrogen cyanide, sulphur dioxide, nitrogen dioxide and the like, react with the electrolyte and/or electrodes, thereby changing the sensitivity of the cell to oxygen. However, when the sample gas is first passed through the same electrolyte in the humidifying container, most of these undesirable gases are removed, and the cell stability is improved.

Since the amount of water vapor taken up by the sample gas passing through the first container is a function of the concentration of the solution in the first container, it is desirable to maintain this concentration substantially constant. This is accomplished by occasionally, such as daily, adding make-up water to the solution in the container to bring it up to a predetermined level. Such make-up water should be pure, free of ions and oxygen. The make-up water is stored in an enclosed container and the sample gas leaving the analysis cell is flowed through this container thereby deoxygenating the make-up water stored therein. At regular intervals or as needed, the deoxygenated make-up water is transferred to the humidifying container.

This process will continuously and accurately measure the oxygen content of a sample gas, giving highly accurate results for weeks of operation with an output that is linear in the range of zero to several hundred parts per million of oxygen. However, a number of problems are presented in the design and construction of apparatus for carrying out this process. Leaks in the apparatus destroy the accuracy of the measurements since air containing oxygen enters the sample gas stream through the leaks. The leaks will also permit oxygen to enter the deaerated make-up water prior to its transfer to the humidifier cell. During the operation of the equipment, it is necessary to occasionally replace the electrolyte in the various cells and to occasionally replace the cell structure itself.

Ease of replacement of components and leak-free construction present conflicting design conditions since these two requirements are ordinarily not compatible. Accordingly, it is an object of this invention to provide a gas analyzer constructed so as to provide the opportunity for a minimum of leaks and to provide easy access and maintenance for the unit. A further object of the invention is to provide such an apparatus having a cell carrier for carrying the cells and providing interconnections therebetween with cell covers for enclosing the cells clamped thereto for easy removal.

It is a further object of the invention to provide a gas analysis apparatus having a liquid reservoir on which the cells are carried with the conduits interconnecting the various cells passing through the reservoir so that only deaerated make-up water or the relatively oxygen free sample gas may enter the gas flow paths through leaks therein. Another object of the invention is to provide such an apparatus having internally positioned valves for transferring liquid from the reservoir to the humidifier cell so that no openings to the surrounding atmosphere are required for valve actuation.

It is another object of the invention to provide gas analysis apparatus which may be operated continuously in a vehicle which rolls and pitches as much as sixty degrees in any direction without affecting the accuracy of the measurements being performed. A further object of the invention is to provide gas analysis apparatus in which the cells may be rapidly and easily removed and replaced and in which the electrolyte may be changed by merely loosening the cell clamps, no pipe line connections being disturbed.

It is also an object of the invention to provide an analysis cell which is compact, rugged, inexpensive, long-lived and easily and quickly replaced. A further object of the invention is to provide such a cell comprising successive layers of an anode, an absorbent material and a cathode wrapped around a cell form with the absorbent material having tabs extending therefrom and adapted to be immersed in a pool of the electrolyte. Another object of the invention is to provide such a cell which is compact in shape, being relatively short and thick so that all of the absorbent material between the electrodes will remain soaked with the electrolyte during the weeks of operation of the apparatus.

Other objects of the invention will more fully appear in the course of the following description wherein preferred embodiments are given by way of illustration or example.

In the drawings:

Fig. 1 is a side view, shown partly in section, of a preferred embodiment of the invention;

Fig. 2 is a sectional view taken along the line 2—2 of Fig. 1;

Fig. 3 is a sectional view taken along the line 3—3 of Fig. 1;

Fig. 4 is an enlarged sectional view of a portion of the apparatus of Fig. 2;

Fig. 5 is a view of a portion of the apparatus of Fig. 1, showing an alternative embodiment of the makeup water control valve;

Fig. 6 is an enlarged sectional view of the analysis cell of the apparatus of Fig. 1;

Fig. 7 is a sectional view taken along the line 7—7 of Fig. 6;

Fig. 8 is an enlarged sectional view of a portion of the apparatus of Fig. 6;

Fig. 9 is a view, shown partly in section and partly diagrammatic, of an alternative embodiment of the invention;

Fig. 10 is a sectional view taken along the line 10—10 of Fig. 9; and

Fig. 11 is a sectional view taken along the line 11—11 of Fig. 9.

The embodiment of the invention shown in Figs. 1 and 2 includes a fluid container or reservoir 20, a humidifier cell 21, an analysis cell 22, and a flowmeter cell 23 carried on the fluid container 20. A gas inlet 24, a gas outlet 25 and a liquid inlet 26 are provided in the wall of the container 20, each of these openings being adapted to receive a pipe line from a remote position.

The gas outlet 25 and the liquid inlet 26 communicate directly with the interior of the container 20. The gas inlet 24 is directly coupled to another opening 29 in the wall of the container 20 by a fluid conduit or pipe 30 positioned within the container 20. Openings 31 and 32 in the wall of the container are coupled by another pipe 33 and openings 34 and 35 are connected by a pipe 36. A large threaded opening 39 is provided in the top of the container 20 and is ordinarily stopped by a threaded plug 40. While not essential to the apparatus of the invention, this opening provides access to the interior of the container for construction and maintenance purposes.

The flowmeter cell 23 is clamped to the wall of the container 20 by screws 41 with the inlet and outlet of the flowmeter cell aligned with the opening 35 and an opening 42 in the wall of the container 20, respectively, sealing engagement being provided at these openings by O-rings 43 and 44 positioned in counterbores in the openings 35 and 42, respectively. The flowmeter may be of any suitable type and preferably is one in which the gas flows past two windings of resistance wire which are connected into an electrical bridge circuit, the difference in resistance of the two windings being an indication of the rate of flow of gas past the windings. This type of flowmeter cell is preferred because it can be manufactured in a flat, compact package for attachment to a container such as shown herein without requiring any pipes, valves or the like.

The cells 21 and 22 are held in sealing engagement against the horizontally disposed lower surface 47 of the container 20 by clamps or bails 48 and 49 respectively, which are pivotally carried on pins 50 projecting from opposite sides of the container 20.

Hollow pins 53 and 54 are fixed in openings 55 and 56 respectively, in the top of the cell 22 and extend upward therefrom for engagement with corresponding openings 32 and 34 in the wall of the container 20. These hollow pins 53, 54 provide fluid communication with the cell and also serve to align the cell with the container when the cell is clamped thereto by the bail 49, O-rings 57 positioned in counterbores in the openings in the cell providing seals at the mating surfaces.

Details of the cell clamping arrangement are shown in Fig. 4, wherein a lock screw 60, preferably made of magnetic material and having a threaded shaft 61, is mounted in that portion of the bail 49 opposite the bottom end 62 of a cell so that the lock screw 60 may be advanced toward the end 62 by rotating the lock screw relative to the bail. A disc 63 of permanently magnetized material is positioned in a counterbore 64 in the lock screw 60, the disc being spaced from the lock screw by a ball 65 of magnetic material positioned therebetween. A conical depression 66 is preferably formed in one of the elements engaging the ball 65 to maintain the ball in a centered position, the depression being shown in the disc 63. A pad 67 of felt or similar material is cemented to the top of the disc 63 to cushion the engagement of the disc and the cell end 62. As the lock screw 60 is manually rotated, it is advanced upward, bringing the pad into engagement with the cell as shown in Figs. 1 and 2. The large diameter of the lock screw provides a long radius for the force applied thereto, permitting rapid and leak-free mounting of the cell to the container manually. The cell may be removed by rotating the lock screw in the opposite direction, swinging the bail to one side and lowering the cell from the container. After equipment of this nature has been used for awhile, parts may become fouled with a dirt and corrosion and it often is difficult to loosen and remove components. The clamp structure described herein is easily removed in spite of dirt and corrosion because the apparatus provides a long radius and hence, high torque for the manually applied force, but provides a very short radius and hence, low torque for the force tending to hold the structure fixed, it being only necessary to break the ball 65 free. The disc 63, being permanently magnetized, attracts the ball 65 and lock screw 60 and reduces the likelihood of its loss when a cell is being mounted or dismounted.

In the analysis cell 22, shown in detail in Figs. 6, 7 and 8, a pool 70 of electrolyte is held in the bottom of a hollow cylindrical cover or container 71 of glass or the like for enclosing the cell, the container 71 being clamped to a cap 72 by the bail 49 with a sealing gasket 73 clamped between the cap and container. The cap 72 includes a cylindrical cell form 74 extending downward therefrom terminating above the surface of the pool 70. The electrodes of the galvanic cell are mounted on the cell form which is provided with successively increasing external diameters for accommodating the material mounted thereon. A first level or diameter 75 occupies the major portion of the form 74 and the anode is mounted thereon. In the preferred embodiment illustrated herein, the anode comprises a sheet 76 of metallic foil doubled over a wire 77 and wrapped around the first diameter 75, the edge of the doubled over sheet containing the wire being positioned in a groove 80 in the cell form. One end of an electrical conductor 81 is connected to the wire 77, the conductor 81 passing through and being sealed in an opening 82 in the cap 72 and terminating at a terminal 83. In an alternative construction, the conductor 81 may be soldered to a tab on the sheet 76 which is extended upward into the opening 82. A layer of absorbent material 84, such as filter paper, is wrapped around the metallic foil on a second level or diameter 85 of the cell form, a plurality of tabs 86 being provided on the layer of absorbent material for reaching into the pool 70. The layer of absorbent material is then wrapped with a plurality of turns of wire 87 which extend substantially the full height of the cell form, the upper end of the wire 87 being joined to a conductor 90 which passes through and is sealed in an opening 91 in the cap 72 and terminates at a terminal 92. While adjacent turns of the wire need not contact each other, they are preferably closely spaced.

Incoming sample gas from the pipe 33 flows through the hollow pin 53, downward through an opening 95 in the cell form 74 outward above the pool 70 and then upward between the inner wall of the container 71 and the wire turns, leaving the cell through an opening 96 and the hollow pin 54 which connects with the pipe 36. A quantity of electrolyte is maintained in the layer of absorbent material 84 between the metallic foil 76 and the wire 87 by capillary action through the tabs 86 in the pool of electrolyte 70. The foil sheet is the anode and the wire is the cathode and when the sample gas containing oxygen flows upward past the wire, the reaction previously described occurs and the current generated in the cell may be measured by any suitable current measuring device connected to the terminals 83, 92 or may be used to actuate a control system for controlling the oxygen content of the sample gas. In its preferred embodiment, the metallic foil of the cell would be lead, the wire would be silver and the electrolyte would be aqueous solution of potassium hydroxide at a concentration of approximately 27.5 percent by weight.

In the construction of the analysis cell described above, it is preferred to make the flow passage between the turns of the cathode and the wall of the container quite small so that the velocity of the sample gas at this point is relatively high resulting in a much higher sensitivity for the instrument. Furthermore, it is preferred that the cell be short and thick, the diameter of the form preferably being more than one third the length of the form, so that the quantity of electrolyte will be substantially equal throughout the layer of absorbent material positioned between the electrodes.

The humidifier cell 21 includes a cap 99, a cover or container 100 and a gasket 101 similar to those used in the analysis cell 22 and is aligned with and clamped to the fluid container 20 by means identical to those of the analysis cell 22. A tube 102 is mounted in the cap 99 and extends downward therefrom into the container 100. The lower end of the tube being enlarged and terminating in a porous cap 103. A liquid 104 including water, preferably a dilute solution of the electrolyte used in the analysis cell 22, is placed in the container 100 with a level above the porous cap 103 and two conductors 105, 106 which are sealed in the wall of the tube 102. The conductors 105, 106 are connected to terminals 107, 108 (Fig. 3) by leads 109, 110 passing upward through the tube 102 and outward through the cap 99. The conductors 105, 106, are used to generate a predetermined quantity of oxygen in the cell by electrolysis for calibrating the instrument, and are preferably made of platinum.

Sample gas flows into the humidifier cell 21 through the gas inlet 24, the pipe 30, the tube 102, and the porous cap 103, and is bubbled upward through the liquid 104 and flows outward to the analysis cell through an opening 113 in the cap 99 and the pipe 33. As the gas passes through the humidifier cell, it takes up water vapor from the liquid 104 and certain gases which may be present in the sample gas react with the liquid as previously described. The size of the humidifier cell, the concentration of the liquid therein and the rate of flow of the sample gas therethrough may be adjusted so that the vapor pressure of water in the sample gas leaving the humidifier cell corresponds to the equilibrium water vapor pressure over the electrolyte in the analysis cell.

Water is transferred from the container 20 to the humidifier cell 21 to make up for the water taken up by the sample gas on passing through the humidifier cell, this water transfer being controlled by a valve coupling the container and humidifier. A preferred embodiment of a valve is shown in Fig. 1, this valve being completely enclosed within the apparatus and requiring no openings through which leaks may occur. A valve stem 115 is mounted within the container 20, being fixed in the wall thereof adjacent the openings 29 and 31 and extending downward from the lower surface 47 engaging an opening 116 in the cap 99. A transverse opening 117 and an axial opening 118 in the valve stem 115 provide fluid communication between the interior of the container 20 and the interior of the humidifier 21. Flow through the openings in the valve stem is blocked by a plunger 119 which fits snugly around the stem 115 and rests on an O-ring 120 which provides a sealing engagement. A block 121 of magnetic material is fixed to the upper end of the plunger 119 and is spaced slightly from the wall of the container 20 when the plunger is in the down or closed position as shown in Fig. 1. Fluid flow occurs from the container to the humidifier when an attractive magnetic field is generated above the container moving the block 121 and plunger 119 upward until the block engages the wall of the container thus unblocking the transverse opening 117. Such a magnetic field may be provided by placing a magnet 122 on top of the container or by energizing an electrical coil positioned above the container or by other suitable means.

This valve may be operated manually or may be operated automatically, such as by energizing the electrical coil periodically from a clock mechanism or by energizing the electrical coil by a level detecting device such as an electric eye circuit or magnetic switch. An alternative embodiment of the valve which provides automatic level control is shown in Fig. 5. A hollow plug 125 is fixed in the cap 99 and extends downward therefrom providing fluid communication from the container 20 to the container 100 through the opening 116 in the cap. A conical point 126 of a float 127 engages a downwardly opening, conical valve seat 128 in the plug 125 for blocking flow of fluid through the plug. Inwardly extending ridges 129 and 130 in the plug 125 guide and limit vertical movement of the float. The plug and float are dimensioned so that when the liquid level in the humidifier cell is below the desired level the float will move downward with the point 127 out of engagement with the valve seat 128. When the liquid level raises to the desired point, the point will engage the valve seat and block further flow of makeup water to the humidifier cell.

In the operation of the apparatus, the fluid container 20 is filled with water through the liquid inlet 26 as required. This water should be pure and free of ions; however, if desired a mixed bed demineralizing resin could be positioned within the container 20 for further purification of the water. This water should also be free of oxygen before being added to the humidifier cell since any oxygen contained therein would disturb the accuracy of the readings. Deaeration of this water is accomplished by passing the sample gas through the container after it leaves the flowmeter cell and before it is exhausted through the gas outlet 25. A sample gas at the desired pressure and flow rate is introduced into the apparatus at the gas inlet 24, flows through the humidifier cell 21, then through the analysis cell 22, then through the flowmeter cell 23, through the interior of the container 20 and out through the gas outlet 25. All of the pipe connections through which the sample gas flows, with the exception of the inlet and outlet 24, 25, are positioned within the apparatus so that any leaks occurring merely permit deaerated, deionized water or sample gas to enter the system thereby substantially eliminating errors in the measurements due to leakages. Such an apparatus may be operated in a vehicle which is rolling and pitching as great as sixty degrees from the horizontal. The unique method of mounting the various cells to the container permtis rapid and easy removal and replacement of cells and yet is substantially leak-free and rugged.

An alternative embodiment of the apparatus of the invention is shown in Figs. 9, 10 and 11 and includes a cell carrier 140, a flowmeter cell 141 and a liquid reservoir 142. The cell carrier 140 provides a unitary structure for a humidifier cell 143 and an analysis cell 144 having a internal flow paths between the cells. A pipe 145 couples the incoming sample gas to the cell carrier, another pipe 146 conducts the sample gas from the cell carrier to the flowmeter cell, a pipe 147 conducts the sample gas from the flowmeter cell to the interior of the reservoir 142 and an overflow pipe 147 provides for exhaust from the reservoir.

Make-up water is fed into the resrvoir 142 as required through a control valve 150 and pipe 151. Deaerated make-up water is conducted to the cell carrier from the reservoir through a pipe 152, flow therein being controlled by a valve 153. With this form of construction, the cell carrier may be very compact and may be mounted separately from the flowmeter and liquid reservoir. The make-up water may be pumped from the reservoir to the cell carrier or the reservoir may be positioned above the cell carrier for gravity feed. This embodiment of the invention may also be mounted in a pitching and rolling vehicle, the inlet for the overflow pipe 147 being placed substantially at the center of the volume of the reservoir so that substantially no liquid is lost therethrough during maneuvering and the exhaust gas pressure is not affected.

The cell carrier 140 includes a central block 156 mounted between clamping plates 157, 158 with a cell form 159 extending upward therefrom. Space for an annular pool 161 of electrolyte is provided at the junction of the cell form 159 with the central block 156, the outer periphery of the pool 161 being a cylindrical shell 162 which also serves as an aligning member for a cell cover or container 163. An analysis cell essentially identical to the cell of Fig. 6 is constructed on the cell form 159 and includes a foil sheet wrapped on the form for an anode, a layer of filter paper around the foil and having tabs extending into the pool of electrolyte, and a layer of closely spaced turns of wire as a cathode.

The humidifier cell 143 includes a tube 166 which is a press fit onto a boss 167 extending downward from the central block 156, the lower end of the tube 166 being closed by a plug 168. A porous disc 169 is clamped between the tube and the plug providing a small enclosed space 170 between the disc and the plug. A cell cover 171 similar to the cover 163 is positioned around the components of the humidifier cell and serves to support a pool of diluted electrolyte 172. The cell covers 163 and 171 are clamped to the central block 156 by clamp rings 175, 176, gaskets 177, 178 and bolts, one of which is shown as 179.

A passage 182 is drilled or otherwise formed in the central block 156 to provide for gas flow from the pipe 145 through a passage 183 in the tube 166 to the base 170. Another passage 184 provides for gas flow from the interior of the tube 166 to the lower end of the base around the analysis cell 144. A passage 185 runs downward through the cell form 159 and provides communication between the upper end of the analysis cell and the pipe 146. The sample gas flows through the various units of the apparatus of Fig. 9 in the same manner as in the apparatus of Figs. 1 and 2. A passage 186 in the central block 156 provides for flow of water from the pipe 152 through the passage 184 into the humidifier cell.

An opening 189 is provided in the wall of the tube 166 near the lower end thereof and a similar opening 190 is provided in the wall of the tube above the normal level of the electrolyte 172. When no gas is passing through the instrument, the level of the liquid within the tube 166 will be the same as the level outside of the tube because of the opening 189. However, when a gas is passing upward through the tube 166 there is bubbling and foaming within the tube and the liquid level is raised above the opening 190 permitting some of the liquid within the tube to flow through the opening 190 into the pool 172. As a result of this, liquid also flows from the pool through the opening 189 into the interior of the tube 166 thereby providing a circulation of electrolyte and equalizing the concentration of the fluid within and without the tube.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a gas analyzer, the combination of: a fluid container having a plurality of openings in the wall thereof, including a gas inlet, a liquid inlet and a gas outlet; a first cell mounted to the external surface of said wall, said first cell having openings therein aligned with and providing communication with certain of said openings in said wall; a second cell mounted to the external surface of said wall, said second cell having openings therein aligned with and providing communication with certain of said openings in said wall; a first fluid conduit positioned within said container in engagement with the internal surface of said wall at two of said openings and providing communication between said gas inlet and said first cell; a second fluid conduit positioned within said container in engagement with the internal surface of said wall at two of said openings and providing communication between said first cell and said second cell; valve means, including aligned openings in said wall and said first cell, for providing controlled liquid flow between the interior of said container and said first cell; and flow means providing communication between said second cell and the interior of said container for gas flow through said gas inlet, said first fluid conduit, said first cell, said second fluid conduit, said second cell, said flow means, said container and said gas outlet.

2. A gas analyzer as defined in claim 1, in which said valve means includes a moving element of magnetic material positioned within said container with at least a portion of said element adjacent said wall for attraction by a magnetic field generated externally of said container.

3. A gas analyzer as defined in claim 1, in which said valve means includes a valve seat and a float positioned in said first cell for engaging said valve seat and blocking liquid flow through said aligned openings.

4. In a gas analyzer, the combination of: a fluid container having a plurality of openings in the wall thereof, including a gas inlet, a liquid inlet and a gas outlet; a first cell mounted to the external surface of said wall, said first cell having openings therein aligned with and providing communication with certain of said openings in said wall; a second cell mounted to the external surface of said wall, said second cell having openings therein aligned with and providing communication with certain of said openings in said wall; a flowmeter cell mounted to the external surface of said wall, said flowmeter cell having two openings therein aligned with and providing communication with two of said openings in said wall; a first fluid conductor positioned within said container in engagement with the internal surface of said wall at two of said openings and providing communication between said gas inlet and said first cell; a second fluid conductor positioned within said container in engagement with the internal surface of said wall at two of said openings and providing communication between said first cell and said second cell; a third fluid conductor positioned within said container in engagement with the internal surface of said wall at two of said openings and providing communication between said second cell and one opening of said flowmeter cell, the other of said openings in said flowmeter cell and said aligned wall opening providing communication between said flowmeter cell and the interior of said container for gas flow through said gas inlet, said first fluid conductor, said first cell, said second fluid conductor, said second cell, said third fluid conductor, said flowmeter cell, said container and said gas outlet; and valve means, including aligned openings in said wall and said first cell, for providing controlled liquid flow between the interior of said container and said first cell.

5. In a gas analyzer, the combination of a fluid container having a plurality of openings in the wall thereof, including a gas inlet, a liquid inlet and a gas outlet; a first cell mounted to the external surface of said wall, said first cell having openings therein aligned with and providing communication with certain of said openings in said wall, with a pair of said aligned openings providing for liquid flow between the interior of said container and said first cell; a second cell mounted to the external surface of said wall, a second cell having openings therein aligned with and providing communication with certain of said openings in said wall; a first fluid conduit positioned within said container in engagement with the internal surface of said wall at two of said openings and providing communication between said gas inlet and said first cell; a second fluid conduit positioned within said container in engagement with the internal surface of said wall at two of said openings and providing communication between said first cell and said second cell; a plunger movable coaxially with said aligned pair of openings for controlling liquid flow therethrough; a float positioned in said first cell and responsive to the liquid level therein for controlling the position of said plunger as a function of said liquid level; and flow means providing communication between said second cell and the interior of said container for gas flow through said gas inlet, said first fluid conduit, said first cell, said second fluid conduit, said second cell, said flow means, said container and said gas outlet.

6. In a gas analyzer, the combination of: a fluid container having a plurality of openings in the wall thereof, including a gas inlet, a liquid inlet and a gas outlet; a first cell for mounting to the external surface of said wall, said first cell having openings therein aligned with and providing communication with certain of said openings in said wall; a second cell for mounting to the external surface of said wall, said second cell having openings therein aligned with and providing communication with certain of said openings in said wall; first and second cell clamps pivotally mounted on said container; a lock screw formed of magnetic material threadedly mounted in each of said clamps, with a clamp being movable over the free end of a corresponding cell opposite the end of such cell engaging said container for positioning a face of the lock screw opposite the free end, said face of said lock screw having a counterbore therein; a permanent magnet positioned in each of said counterbores; a ball positioned within each of said counterbores between the lock screw and the permanent magnet, said permanent magnet being engageable with said free end of said cell to urge said cell and container into sealing engagement by rotation of said lock screw; a first fluid conduit positioned within said container in engagement with the internal surface of said wall at two of said openings and providing communication between said gas inlet and said first cell; a second fluid conduit positioned within said container in engagement with the internal surface of said wall at two of said openings and providing communication between said first cell and said second cell; valve means, including aligned openings in said wall and said first cell, for providing controlled liquid flow between the interior of said container and said first cell; and flow means providing communication between said second cell and the interior of said container for gas flow through said gas inlet, said first fluid conduit, said first cell, said second fluid conduit, said second cell, said flow means, said container and said gas outlet.

(References on following page)

References Cited in the file of this patent

UNITED STATES PATENTS

| | | |
|---|---|---|
| 1,705,042 | Babitch | Mar. 12, 1929 |
| 1,940,612 | Sweeney | Dec. 19, 1933 |
| 2,114,234 | Ornstein | Apr. 12, 1938 |
| 2,448,206 | Bailey | Aug. 31, 1948 |
| 2,508,238 | Fagen | May 16, 1950 |
| 2,585,060 | Wallace | Feb. 12, 1952 |
| 2,651,612 | Haller | Sept. 8, 1953 |
| 2,756,128 | Gerrish | July 24, 1956 |
| 2,805,191 | Hersch | Sept. 3, 1957 |

FOREIGN PATENTS

| | | |
|---|---|---|
| 516,935 | Belgium | Jan. 31, 1953 |

UNITED STATES PATENT OFFICE
CERTIFICATE OF CORRECTION

Patent No. 2,943,036            June 28, 1960

Louis C. Thayer et al.

It is hereby certified that error appears in the printed specification of the above numbered patent requiring correction and that the said Letters Patent should read as corrected below.

Column 1, line 57, for "eraction" read -- reaction --; column 7, line 73, before "internal" strike out "a"; column 10, line 14, for "a second" read -- said second --.

Signed and sealed this 6th day of December 1960.

(SEAL)
Attest:

KARL H. AXLINE
Attesting Officer

ROBERT C. WATSON
Commissioner of Patents